US012618968B2

(12) United States Patent
Shin

(10) Patent No.: US 12,618,968 B2
(45) Date of Patent: May 5, 2026

(54) RADAR APPARATUS, CONTROL METHOD THEREOF, AND DRIVER ASSISTANCE SYSTEM INCLUDING SAME

(71) Applicant: HL KLEMOVE CORP., Incheon (KR)

(72) Inventor: Junsik Shin, Seoul (KR)

(73) Assignee: HL KLEMORE CORP., Incheon (KR)

( * ) Notice: Subject to any disclaimer, the term of this patent is extended or adjusted under 35 U.S.C. 154(b) by 511 days.

(21) Appl. No.: 18/122,222

(22) Filed: Mar. 16, 2023

(65) Prior Publication Data

US 2023/0296764 A1     Sep. 21, 2023

(30) Foreign Application Priority Data

Mar. 16, 2022    (KR) ........................ 10-2022-0032498

(51) Int. Cl.
*G01S 13/931* (2020.01)
*G01S 13/62* (2006.01)

(52) U.S. Cl.
CPC ........... *G01S 13/931* (2013.01); *G01S 13/62* (2013.01); *G01S 2013/9318* (2020.01); *G01S 2013/93185* (2020.01); *G01S 2013/9319* (2020.01)

(58) Field of Classification Search
CPC ................... G01S 13/931; G01S 13/62; G01S 2013/93185; G01S 2013/9318; G01S 2013/9319
See application file for complete search history.

(56) References Cited

U.S. PATENT DOCUMENTS

| | | | |
|---|---|---|---|
| 8,762,043 B2 * | 6/2014 | Eidehall ............. | B62D 15/0265 |
| | | | 701/302 |
| 2010/0023216 A1 * | 1/2010 | Huang ................... | B62D 6/007 |
| | | | 701/42 |
| 2018/0174465 A1 * | 6/2018 | Ikedo ................ | B60W 50/0097 |
| 2019/0077398 A1 * | 3/2019 | Kusano ............. | B60W 30/0956 |
| 2020/0349718 A1 * | 11/2020 | Dang ...................... | G01S 17/58 |

(Continued)

FOREIGN PATENT DOCUMENTS

| | | |
|---|---|---|
| KR | 10-2012-0094365 | 8/2012 |
| KR | 10-2020-0104916 | 9/2020 |

(Continued)

OTHER PUBLICATIONS

Office Action dated Nov. 26, 2024 for Korean Patent Application No. 10-2022-0032498 and its English translation provided by Applicant's foreign counsel.

(Continued)

*Primary Examiner* — Bernarr E Gregory
*Assistant Examiner* — Nazra Nur Waheed
(74) *Attorney, Agent, or Firm* — WOMBLE BOND DICKINSON (US) LLP

(57) ABSTRACT

Disclosed herein is a radar apparatus including a transmitter configured to transmit a transmission signal, a receiver configured to receive a reception signal reflected from a target, and a signal processor, wherein the signal processor detects one or more objects corresponding to one or more points reflected from the target, estimates a heading angle of the target based on the one or more detected objects, determines a lane change direction of the target based on the estimated heading angle, and corrects a transverse position of the target based on the determined lane change direction.

17 Claims, 7 Drawing Sheets

(56) References Cited

U.S. PATENT DOCUMENTS

| | | | | | |
|---|---|---|---|---|---|
| 2022/0147744 | A1* | 5/2022 | Hwang | .............. | G01C 21/3848 |
| 2022/0203972 | A1* | 6/2022 | Yoo | .......................... | G01S 17/58 |
| 2022/0203974 | A1* | 6/2022 | Lee | ................... | B60W 30/0956 |
| 2022/0396313 | A1* | 12/2022 | Ryne | .................... | B62D 5/0463 |

FOREIGN PATENT DOCUMENTS

| | | |
|---|---|---|
| KR | 10-2178585 | 11/2020 |
| KR | 10-2021-0029927 | 3/2021 |
| KR | 10-2021-0153998 | 12/2021 |

OTHER PUBLICATIONS

Office Action (2nd) dated Aug. 18, 2025 for Korean Patent Application No. 10-2022-0032498 and its English translation provided by Applicant's foreign counsel.

\* cited by examiner

RADAR APPARATUS, CONTROL METHOD THEREOF, AND DRIVER ASSISTANCE SYSTEM INCLUDING SAME

CROSS-REFERENCE TO RELATED APPLICATION

This application claims the benefit of Korean Patent Application No. 10-2022-0032498, filed on Mar. 16, 2022 in the Korean Intellectual Property Office, the disclosure of which is incorporated herein by reference.

BACKGROUND

1. Field

Embodiments of the present disclosure relate to a radar apparatus for detecting a vehicle using radar, a control method thereof, and a driver assistance system including the same.

2. Description of the Related Art

Generally, advanced driver assistance systems (ADASs) are being applied to vehicles to provide convenience to drivers and improve driving safety by assisting with vehicle control based on information acquired through sensors installed in the vehicles.

For example, ADASs including smart cruise control (SCC) for automatically maintaining a distance with a forward vehicle, a highway driving assist system (HDA) for automatically maintaining a distance with a forward vehicle while traveling on the highway, and a traffic jam assist (TJA) for temporarily supporting autonomous driving in traffic jams are being installed in vehicles.

Since these ADASs use radar to detect a position and a speed of a forward vehicle, detection performance of the radar occupies a very important part in an autonomous driving technology. In the currently commercialized technology, deceleration and acceleration control is performed by detecting the rear of a forward vehicle using radar and following a position and a speed of a target through tracking of corresponding information.

In the case of the radar, when a forward vehicle is a target which is changing a lane, due to characteristics of the radar using reflection of a radar signal, the performance of estimating a transverse position of the target is lower than that of a camera. For this reason, acceleration and deceleration control may be adversely affected during driver assistance control.

SUMMARY

Therefore, it is an aspect of the present disclosure to provide a radar apparatus capable of more accurately and reliably determining a transverse position of a target which is changing a lane, a control method thereof, and a driver assistance system including the same.

Additional aspects of the present disclosure will be set forth in part in the description which follows and, in part, will be obvious from the description, or may be learned by practice of the disclosure.

In accordance with one aspect of the present disclosure, a radar apparatus includes a transmitter configured to transmit a transmission signal, a receiver configured to receive a reception signal reflected from a target, and a signal processor electrically connected to the transmitter and the receiver, wherein the signal processor detects one or more objects corresponding to one or more points reflected from the target, estimates a heading angle of the target based on the one or more detected objects, determines a lane change direction of the target based on the estimated heading angle, and corrects a transverse position of the target based on the determined lane change direction.

The signal processor may accumulate objects detected during a plurality of scans and estimate the heading angle of the target based on the accumulated objects.

The signal processor may accumulate objects detected during a plurality of scans, estimate a traveling direction of the target based on the accumulated objects, and estimate the heading angle of the target based on the estimated traveling direction.

The signal processor may compare the estimated heading angle with a heading angle threshold for lane change determination and determine the lane change direction of the target.

The signal processor may determine that the target changes a lane to the right when the estimated heading angle is greater than a first heading angle threshold for right lane change determination and determine that the target changes a lane to the left when the estimated heading angle is greater than a second heading angle threshold for left lane change determination.

The signal processor may determine the heading angle threshold according to a speed of the target.

The signal processor may determine that the heading angle threshold value decreases when the speed of the target increases.

The signal processor may determine that the heading angle threshold value increases when the speed of the target decreases.

The signal processor may correct the transverse position of the target so that the transverse position of the target moves in the determined lane change direction.

The signal processor may selectively assign weight values to a plurality of currently detected objects according to the determined lane change direction and correct the transverse position of the target by applying the objects to which the weight values are assigned.

The signal processor may assign the weight values to objects in a right direction among the plurality of currently detected objects when the determined lane change direction is in the right direction.

The signal processor may assign the weight values to objects in a left direction among the plurality of currently detected objects when the determined lane change direction is in the left direction.

In accordance with another aspect of the present disclosure, a method of controlling a radar apparatus includes transmitting a transmission signal, receiving a reception signal reflected from a target, detecting one or more objects corresponding to one or more points reflected from the target, estimating a heading angle of the target based on the one or more detected objects, determining a lane change direction of the target based on the estimated heading angle, and correcting a transverse position of the target based on the determined lane change direction.

The estimating of the heading angle may include accumulating objects detected during a plurality of scans, estimating a traveling direction of the target based on the accumulated objects, and estimating the heading angle of the target based on the estimated traveling direction.

The determining of the lane change direction may include comparing the estimated heading angle with a heading angle threshold for lane change determination, and determining the lane change direction of the target.

The determining of the lane change direction may include determining the heading angle threshold according to a speed of the target, comparing the estimated heading angle with the determined heading angle threshold, and determining the lane change direction of the target.

The correcting of the transverse position may include correcting the transverse position of the target and moving the transverse position of the target in the determined lane change direction.

The correcting of the transverse position may include selectively assigning weight values to a plurality of currently detected objects according to the determined lane change direction, and correcting the transverse position of the target by applying the objects to which the weight values are assigned.

The correcting of the transverse position may include assigning the weight values to objects in a right direction among the plurality of currently detected objects when the determined lane change direction is in the right direction, and assigning the weight values to objects in a left direction among the plurality of currently detected objects when the determined lane change direction is in the left direction.

In accordance with still another aspect of the present disclosure, a driver assistance system includes a radar apparatus configured to detect objects of a target in front of a vehicle, an actuator configured to perform at least one among steering, deceleration, and acceleration of the vehicle, and a controller electrically connected to the radar apparatus, wherein the controller detects one or more objects corresponding to one or more points reflected from the target through the radar apparatus, estimates a heading angle of the target based on the one or more detected objects, determines a lane change direction of the target by comparing the estimated heading angle with a heading angle threshold for lane change direction, and corrects a transverse position of the target according to the determined lane change direction.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

Figure 1:
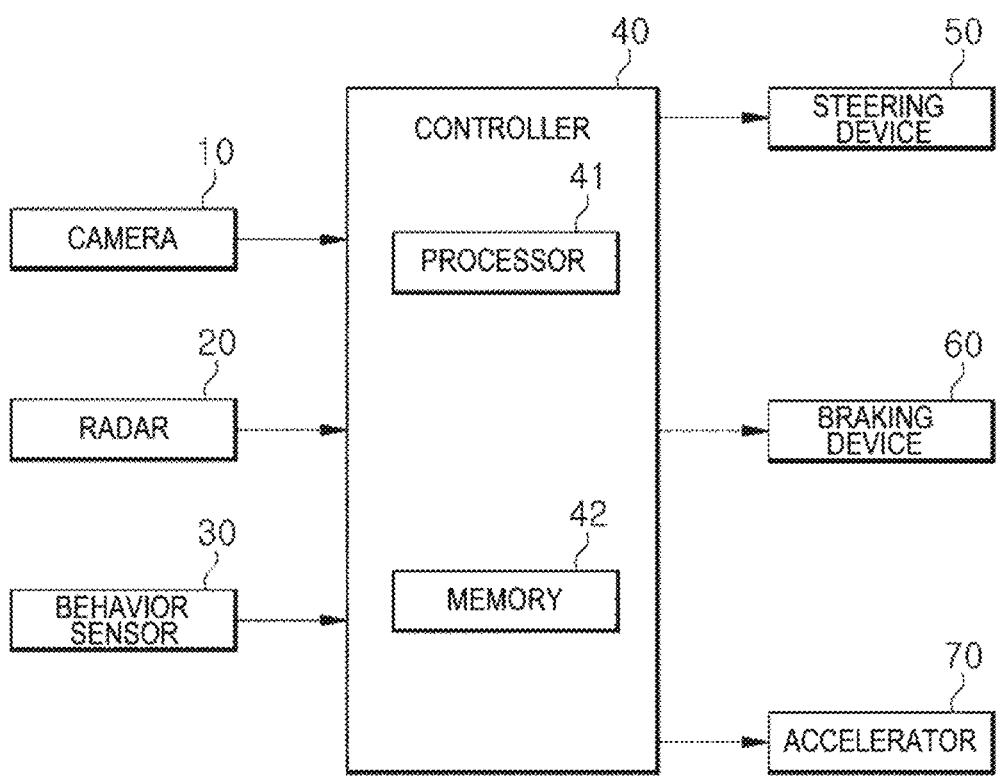
FIG. 1 is a control block diagram illustrating a driver assistance system according to an embodiment.

The same reference numeral refers to the same component throughout the present specification. The present specification does not describe all components of embodiments, with common descriptions in the technical field to which the present disclosure pertains and overlapping descriptions between the embodiments being omitted. The terms "part," "module," "member," and "block" used herein may be implemented in software or hardware, and according to embodiments, a plurality of "parts," "modules," "members," and "blocks" can be implemented in a single component or a single "part," "module," "member," or "block" can include a plurality of components.

Throughout the present specification, when a part is referred to as being "connected" to another part, this includes not only a direct connection but also an indirect connection, and the indirect connection includes a connection through a wireless communication network.

Further, when a part is referred to as "including" a component, this means that the part can include other elements, not excluding the other components unless specifically stated otherwise.

Throughout the present specification, when a member is referred to as being "on" another member, this includes not only when the member is in contact with the other member, but also when another member is present between the member and the other member.

Terms "first," "second," and the like are used to distinguish one component from another component, and components are not limited by these terms. The singular forms include plural forms unless the context clearly notes otherwise.

In each of steps, a reference numeral is used for convenience of description, and this reference numeral does not describe the order of the steps, and the steps may be differently performed from the described order unless clearly specified in the context.

FIG. 1 is a control block diagram illustrating a driver assistance system according to an embodiment.

Referring to FIG. 1, a driver assistance system may include a camera 10, a radar 20, a behavior sensor 30, and a controller 40.

The controller 40 may perform overall control of the driver assistance system.

The camera 10, the radar 20, and the behavior sensor 30 may be electrically connected to the controller 40. The controller 40 may be communicatively connected to the camera 10, the radar 20, and the behavior sensor 30.

The controller 40 may control actuators of a steering device 50, a braking device 60, and an accelerator 70. In addition, the controller 40 may be electrically connected to other electronic devices of a vehicle.

The camera 10, the radar 20, and the behavior sensor 30 may each include an electronic control unit (ECU). The controller 40 may be implemented as an integrated ECU including an ECU of the camera 10, an ECU of the radar 20, and an ECU of the behavior sensor 30.

The camera 10 may capture a forward view of the vehicle and identify vehicles, pedestrians, cyclists, motorcyclists, lanes, and road signs.

The radar 20 may acquire relative positions and relative speeds of objects (e.g., other vehicles, pedestrians, cyclists, and the like) in the vicinity of the vehicle.

The radar 20 may have a field of sensing directed to the front, the front right, and the front left of the vehicle.

The radar 20 may also be implemented as a light detection and ranging (LiDAR) device.

The behavior sensor 30 may acquire behavior data of the vehicle. For example, the behavior sensor 30 may include a speed sensor for detecting a wheel speed, an acceleration sensor for detecting lateral acceleration and longitudinal acceleration of the vehicle, a yaw rate sensor for detecting a yaw rate of the vehicle, and a steering angle sensor for detecting a steering wheel rotation and a steering angle. The behavior data may include a vehicle speed, longitudinal acceleration, lateral acceleration, a steering angle, and a yaw rate.

The steering device 50 may change a traveling direction of the vehicle under the control of the controller 40. The braking device 60 may decelerate the vehicle by braking wheels of the vehicle under the control of the controller 40. The accelerator 70 may accelerate the vehicle by driving an engine and/or a driving motor, which provides a driving force to the vehicle, under the control of the controller 40.

The controller 40 may include a processor 41 and a memory 42.

The controller 40 may include one or more processors 41. The one or more processors 41 included in the controller 40 may be integrated on one chip or may be physically separated. In addition, the processor 41 and the memory 42 may be implemented as a single chip.

The processor 41 may process image data of the camera 10 and radar data of the radar 20. In addition, the processor 41 may generate a steering signal for controlling the steering device 50, a braking signal for controlling the braking device 60, and an acceleration signal for controlling the accelerator 70.

For example, the processor 41 may include an image signal processor for processing the image data of the camera 10, include a digital signal processor for processing the radar data of the radar 20, and include a micro control unit (MCU) for generating the steering signal, the braking signal, and the acceleration signal.

The memory 42 may include volatile memories such as a static random access memory (SRAM) and a dynamic RAM (DRAM) as well as non-volatile memories such as a flash memory, a read only memory (ROM) and an erasable and programmable ROM (EPROM).

In order for the controller 40 to control the vehicle using target information input from the camera 10 and/or the radar 20, for example, the radar 20 needs to accurately recognize targets in the vicinity of the vehicle and output accurate target information.

Hereinafter, a radar apparatus 20 which is able to perform all functions of the radar 20 will be described in detail.

Figure 2:
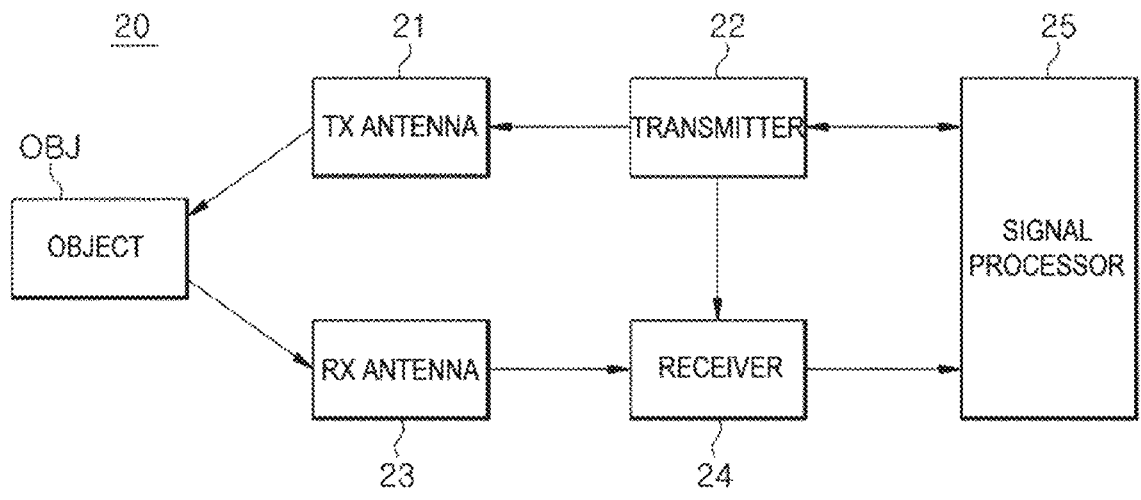
FIG. 2 is a control block diagram illustrating a radar apparatus according to an embodiment.

FIG. 2 is a control block diagram illustrating a radar apparatus according to an embodiment.

Referring to FIG. 2, the radar apparatus 20 may include a transmitting antenna 21, a transmitter 22, a receiving antenna 23, a receiver 24, and a signal processor 25.

The transmitter 22 generates a radar signal and transmits the radar signal through the transmitting antenna 21.

The transmitter 22 may generate a radar signal transmitted through the transmitting antenna 21. The transmitter 22 may generate a frequency modulated continuous wave (FMCW) transmitted through the transmitting antenna 21.

The receiver 24 receives the radar signal reflected from an object OBJ through the receiving antenna 23.

The receiver 24 may receive and process the reflected radar signal through the receiving antenna 23. For example, the receiver 24 may include a component such as an analog-to-digital converter (ADC) for converting the received radar signal into a baseband signal, amplifying the baseband signal, and converting the amplified baseband signal into a digital signal.

The signal processor 25 controls the transmitter 22 to generate a radar signal and transmit the generated radar signal through the transmitting antenna 21.

The signal processor 25 processes the radar signal received from the receiver 24.

For example, the concept used for the signal processor 25 may include an MCU or a digital signal processor (DSP). The signal processor 25 may include one or more processors and one or more memories. The one or more processors may be integrated into a single chip or may be physically separated. In addition, the processor and the memory may be implemented as a single chip. The memory may include volatile memories such as an SRAM and a DRAM as well as non-volatile memories such as a flash memory, a ROM and an EPROM.

The signal processor 25 transmits a frequency-modulated continuous signal (chirp signal) whose frequency changes linearly in a time domain and detects an object OBJ of the target based on a frequency difference component (bit signal) obtained by mixing portions of the received signal reflected from the surrounding objects and the transmitted signal.

The signal processor 25 may generate tracks based on the object OBJ corresponding to a reflection point of the target, cluster the tracks based on a predetermined condition, and output target information of the target corresponding to the clustered tracks.

Figure 3:
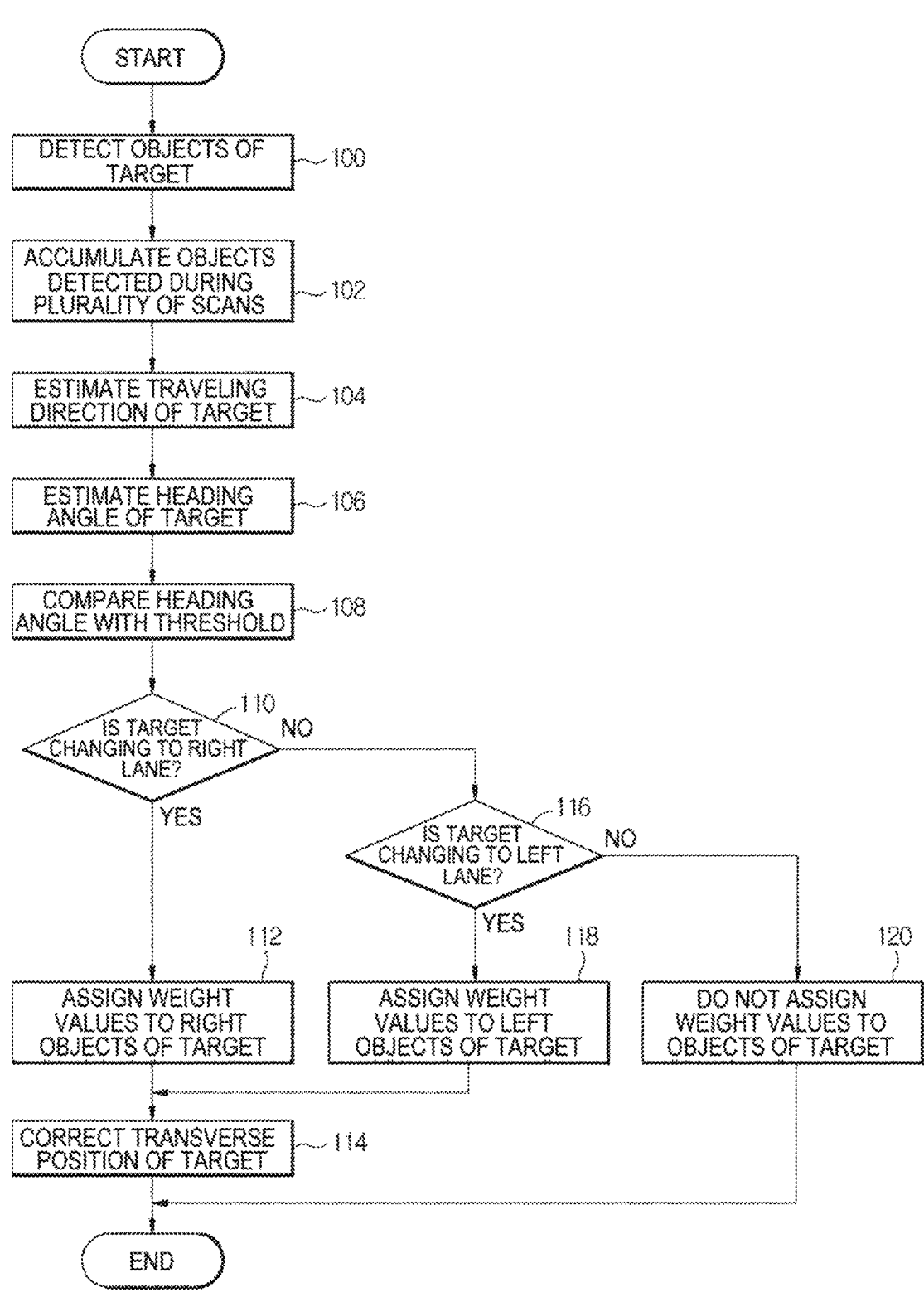
FIG. 3 is a control flowchart illustrating a method of controlling a radar apparatus according to an embodiment.

FIG. 3 is a control flowchart illustrating a method of controlling a radar apparatus according to an embodiment.

Referring to FIG. 3, the signal processor 25 detects objects of a target according to a transmitted signal and a received signal (100).

The signal processor 25 accumulates the objects detected during a plurality of scans (102).

The signal processor 25 estimates a traveling direction of the target (104).

Figure 4:
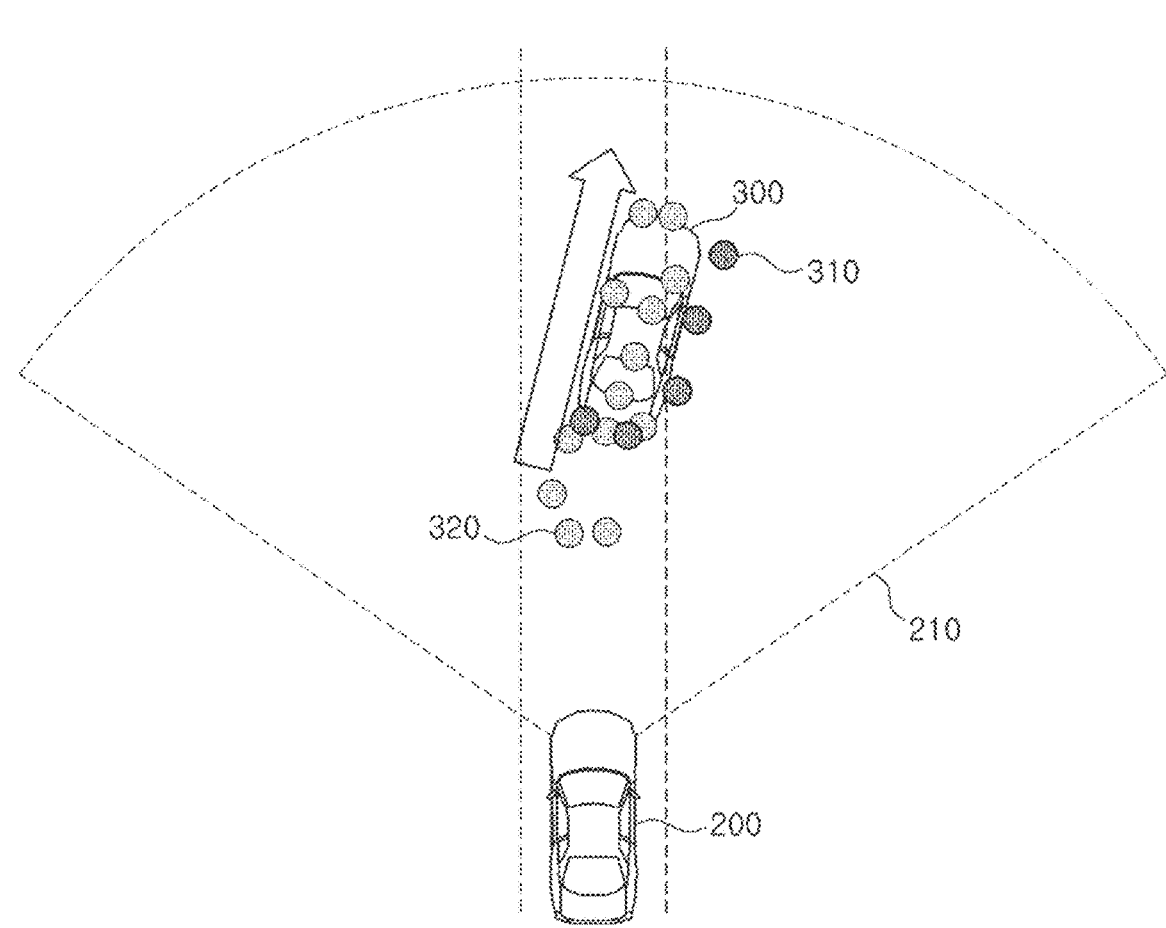
FIG. 4 is a diagram illustrating a process in which the radar apparatus according to an embodiment accumulates objects of a target and determines a traveling direction of the target.

FIG. 4 is a diagram illustrating a process in which the radar apparatus according to an embodiment accumulates objects of a target and determines a traveling direction of the target.

Referring to FIG. 4, the radar apparatus 20 included in an own vehicle 200 may sense a target 300 in the vicinity of the own vehicle 200, for example, a forward vehicle, through a predetermined sensing region 210.

Meanwhile, when transmission signals transmitted from the radar apparatus reach a target 300 included in the sensing region 210 of the radar apparatus 20 and reception signals reflected from the target 300 are returned to and received by the radar apparatus 20, objects 310, which are reflected points, are generated for the target 300. The radar apparatus 20 may determine distance information, speed information, and angle information on the objects 310 corresponding to the target 300.

In order to estimate a heading angle of the target 300, the objects 310 and 320 of the target 300 accumulated during n scans are accumulated.

When the objects 310 and 320 of the target 300 are accumulated during the n scans, in order to check a traveling direction of the target 300, movement of the target 300 in a global coordinate system is estimated by compensating for movement due to the own vehicle 200. The radar apparatus 20 may receive behavior data including a yaw rate of the own vehicle 200 therefrom and compensate for the movement of the own vehicle 200 through the behavior data.

Reference numeral 320 denotes the objects 320 accumulated during the n scans. Reference numeral 320 denotes objects 320 for which the movement of the own vehicle 200 is compensated and accumulated during the n scans. Reference numeral 310 denotes objects detected during a current scan.

As in an arrow direction, the traveling direction of the target 300 may be estimated from the objects 310 detected during the current scan and the objects 320 accumulated during scans (n scans) prior to the current scan.

Since the accumulated result prior to the n scans is not meaningful data for estimating a current heading angle, the accumulated result is not used for estimation.

Meanwhile, the radar apparatus 20 may generate a track based on the objects 310 and 320 of the target 300. For example, one or more tracks may be generated according to a distance between the objects. The radar apparatus 20 tracks one or more tracks, estimates track characteristics including traveling directions, longitudinal speeds, and transverse speeds of the tracked tracks, and clusters tracks satisfying a predetermined clustering condition based on the estimated track characteristics. Thus, the radar apparatus 20 may determine target information including a position, a speed, and a size of the target. The traveling direction of the target 300 may be confirmed from the above target information.

Referring to FIG. 3 again, the signal processor 25 estimates a heading angle of the target according to the traveling direction of the target (106).

Figure 5:
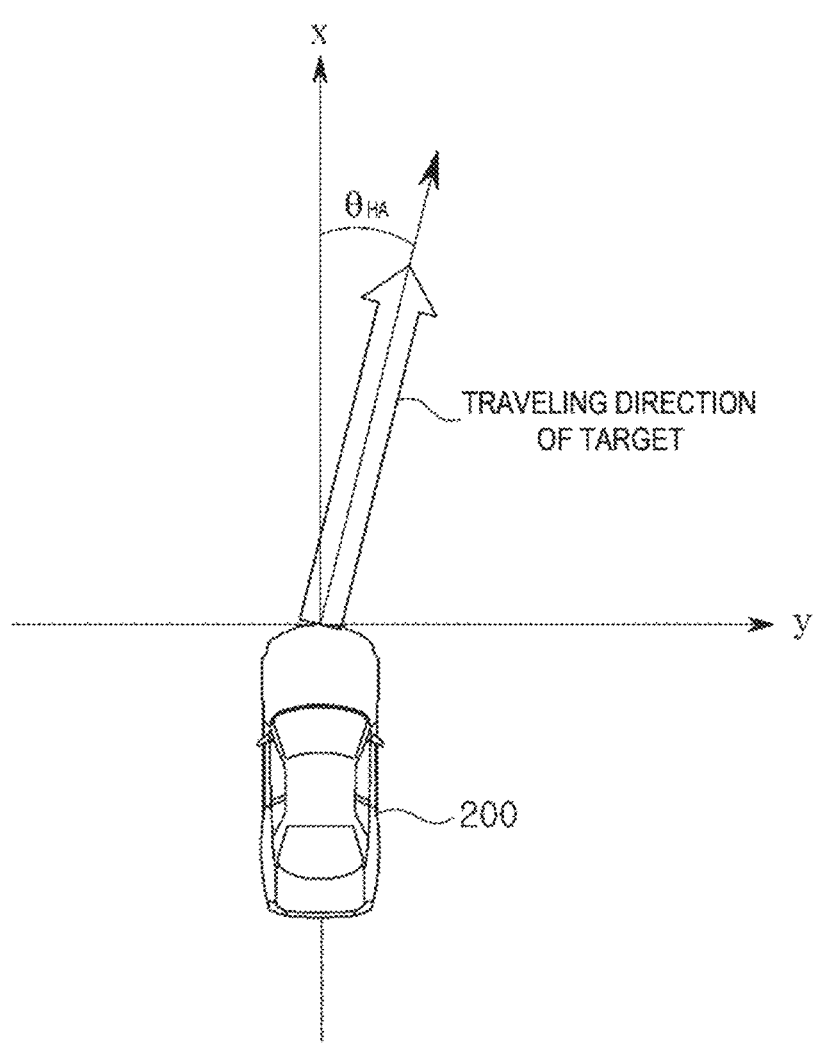
FIG. 5 is a diagram illustrating a process in which the radar apparatus according to an embodiment estimates a heading angle of the target.

FIG. 5 is a diagram illustrating a process in which the radar apparatus according to an embodiment estimates a heading angle of the target.

Referring to FIG. 5, a heading angle $\theta_{HA}$ of the target 300 may be estimated by projecting the estimated heading direction (arrow direction) of the target 300 on a polar coordinate system based on a traveling direction (x-axis) of the own vehicle 200. The heading angle $\theta_{HA}$ of the target 300 is an angle of the traveling direction (the arrow direction) of the target 300 with respect to the traveling direction (x-axis) of the own vehicle 200.

Referring to FIG. 3 again, the signal processor 25 compares the heading angle of the target with a heading angle threshold for cut-out determination in order to determine whether the target is changing a lane (108).

Figure 6:
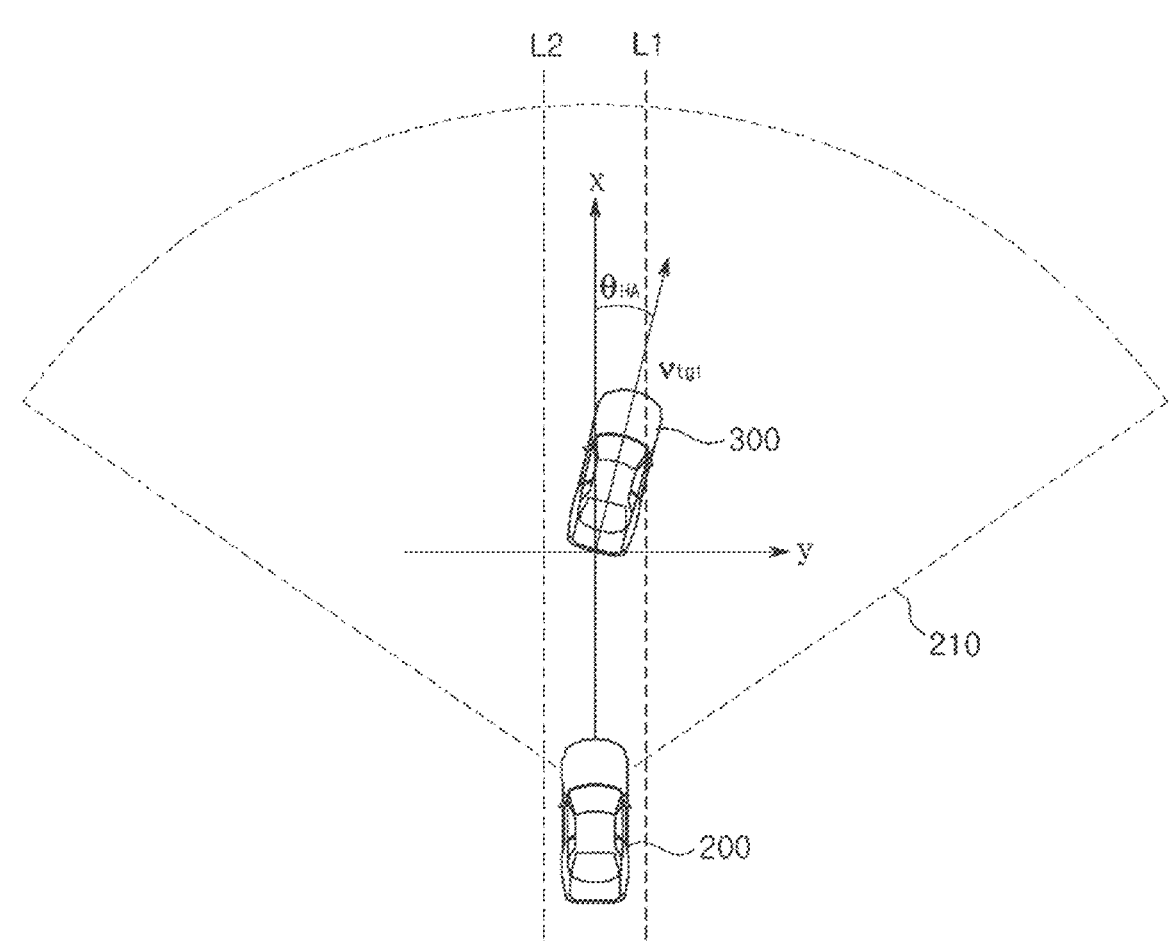
FIG. 6 is a diagram illustrating a process in which the radar apparatus according to an embodiment determines whether the target changes a lane and determines a lane change direction.

FIG. 6 is a diagram illustrating a process in which the radar apparatus according to an embodiment determines whether the target changes a lane and determines a lane change direction.

Referring to FIG. 6, in order to determine whether a lane on which the target 300 travels is changed using the heading angle $\theta_{HA}$ of the target 300, it is necessary to determine the heading angle threshold for lane change determination.

An actual lane change is possible only when a target speed and the heading angle are enough to deviate from lanes L1 and L2. Therefore, the heading angle threshold for determining whether a lane change is occurring may be determined based on the target speed. That is, the heading angle threshold ($\theta_{th}>0$) may be expressed as a function of the target velocity ($v_{tgt}$). The heading angle threshold may be changed according to sensitivity of the lane change determination.

For example, the target 300 moves transversely to some extent while traveling. When the target 300 moves transversely, the heading angle for deviating from a lane is determined according to the speed of the target 300. That is, when the target 300 moves at a high speed, the target 300 may easily deviate from a lane even when the heading angle is small. When the target 300 moves slowly, the heading angle should be large in order to deviate from a lane. Accordingly, a heading angle threshold for deviating from a lane may be determined according to a target speed.

By comparing the heading angle $\theta_{HA}$ of the target 300 with the heading angle threshold $\theta_{th}$, a behavior state of the target 300 for a lane change may be estimated.

When the target 300 is changing a lane to the left, a condition of $\theta_{HA}<-\theta_{th}$ is satisfied.

On the other hand, when the target 300 is changing a lane to the right, a condition of $\theta_{HA}>\theta_{th}$ is satisfied.

Otherwise, it may be estimated that the target 300 is traveling while maintaining a current lane.

Therefore, by comparing the heading angle $\theta_{HA}$ of the target 300 with the heading angle threshold $\theta_{th}$, it is possible to determine whether the target 300 changes a lane and a lane change direction.

Referring to FIG. 3 again, the signal processor 25 determines whether the target is changing a lane to the right (110).

When the target is changing a lane to the right (Yes in 110), the signal processor 25 assigns weight values to right objects among the objects of the target to move a transverse position of the target to the right (112).

The signal processor 25 corrects the transverse position of the target by applying the weight values assigned to the right objects (114). The transverse position of the target before weight value correction is corrected to the transverse position of the target after the weight correction.

Otherwise, when the target is not changing a lane to the right (No in 110), the signal processor 25 determines whether the target is changing a lane to the left (116).

When the target is changing a lane to the left (Yes in 116), the signal processor 25 assigns weight values to left objects among the objects of the target to move a transverse position of the target to the left (118).

The signal processor 25 corrects the transverse position of the target by applying the weight values assigned to the left objects (114).

Otherwise, when the target is not changing a lane to the left (No in 116), the signal processor 25 does not assign weight values to the objects of the target (120).

Figure 7:
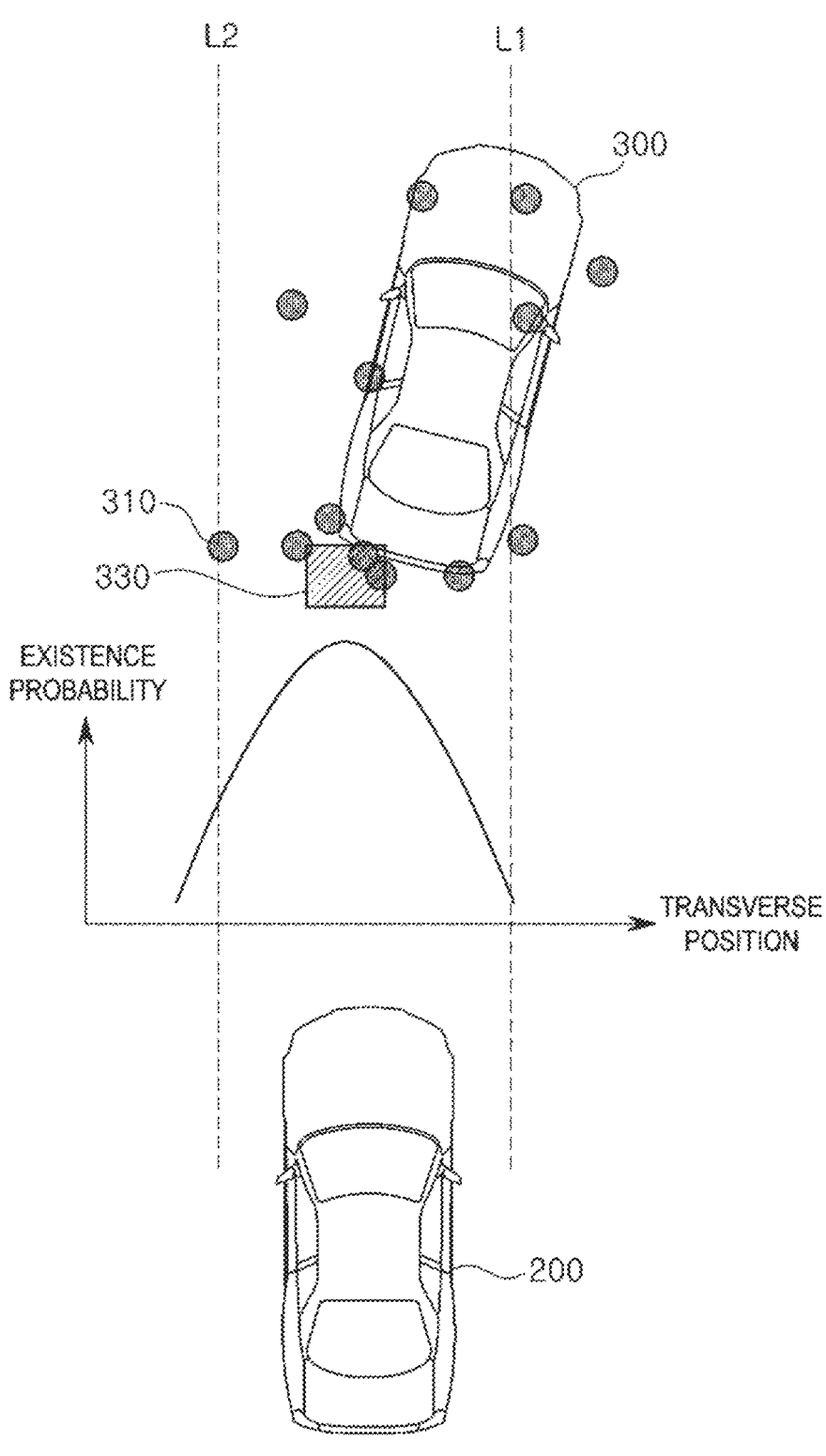
FIG. 7 is a diagram illustrating a transverse position of the target before the radar apparatus according to an embodiment corrects the transverse position.
Figure 8:
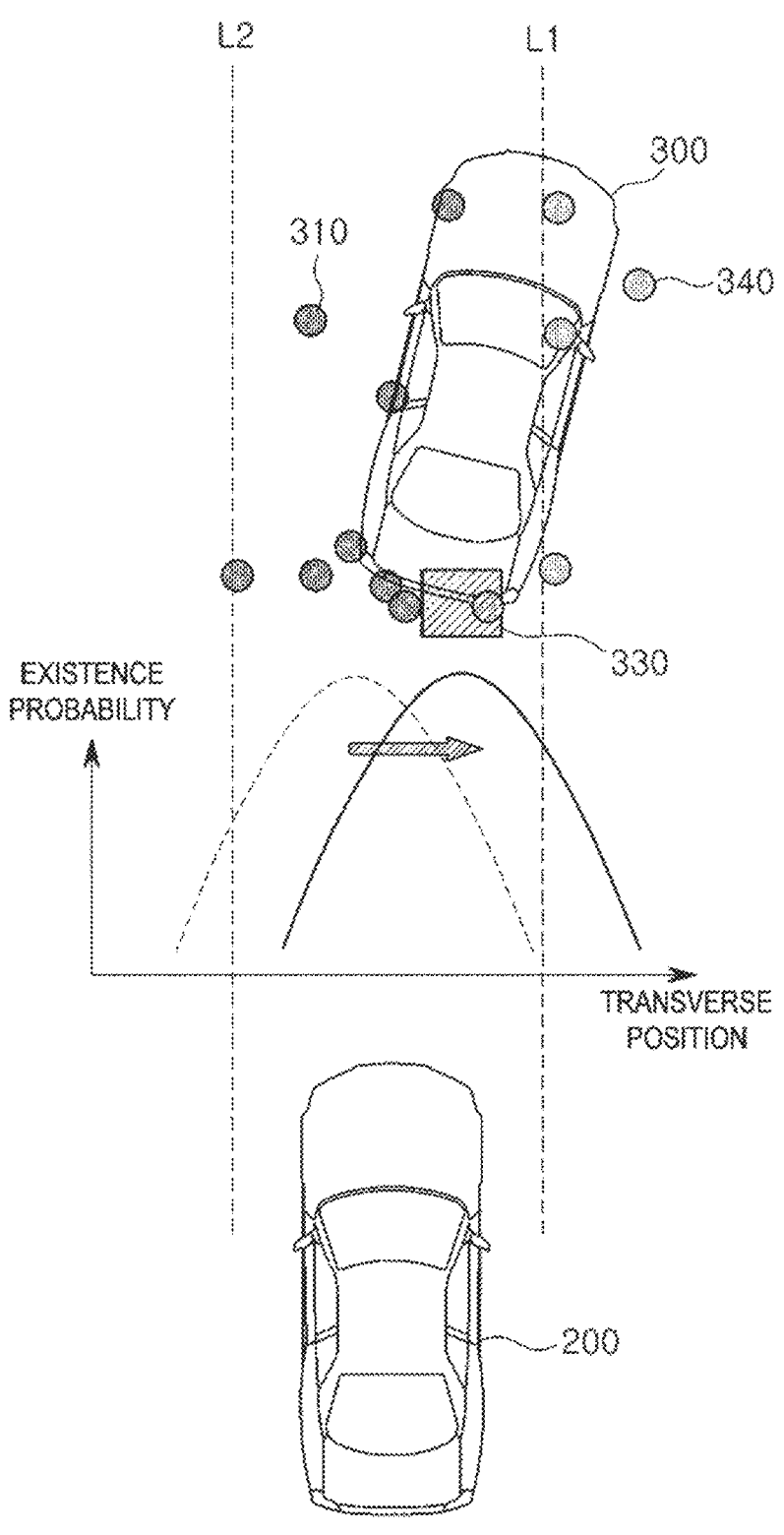
FIG. 8 is a diagram illustrating a transverse position of the target after the radar apparatus according to an embodiment corrects the transverse position.

FIG. 7 is a diagram illustrating a transverse position of the target before the radar apparatus according to an embodiment corrects the transverse position, and FIG. 8 is a diagram illustrating a transverse position of the target after the radar apparatus according to an embodiment corrects the transverse position.

Referring to FIGS. 7 and 8, a situation in which the target 300 deviates from a right lane L1 among left and right lanes L1 and L2 and is changing a lane to the right is shown.

Reference numeral 310 denotes objects of the target 300 detected during a current scan, and reference numeral 330 denotes a transverse position of the target 300 estimated from the objects 310 detected during the current scan.

Even when the target 300 starts to change a lane to the right and the transverse position is changed, a detection frequency in the vicinity of a corner close to the radar apparatus 20 of the own vehicle 200 among rear corners of the target 300 is high. Thus, even when the target 300 is changing a lane, movement of the transverse position due to the lane change may appear slowly.

As shown in FIG. 7, even when the target 300 is changing a lane to the right, the detection frequency of the objects 310 is high at a left corner of the target 300. The detected objects 310 appear densely in a quadrangular box corresponding to the transverse position 330. Since the detected objects 310 appear in a dense form, a probability that the transverse position 330 of the target 300 is in the center of the lane is higher than a probability that the transverse position 330 thereof is in the vicinity of the lane. Thus, it may be determined that the transverse position 330 of the target 300 is positioned closer to the center of the lane than an actual transverse position. As described above, when the target 300 changes lanes, since accuracy of the transverse position is lowered due to a high edge detection frequency, it may be determined that the target 300 moves transversely more slowly than the actual movement of the target 300, which may delay the lane change determination.

As shown in FIG. 8, when the target 300 changes a lane to the right, weight values are assigned to objects 340 positioned relatively to the right among objects 310 and 340 of the target 300 so that a transverse position 330 of the target 300 may be corrected to be moved to the right more than an actual transverse position.

Therefore, a probability that the transverse position 330 of the target 300 is in the vicinity of a lane may become higher than a probability that the transverse position 330 of the target 300 is at the center of the lane. Thus, the transverse position 330 of the target 300 may be accurately determined as the actual transverse position. That is, by selectively assigning weight values only to objects corresponding to a lane change direction among the objects of the target 300, it is possible to estimate the transverse position more accurately compared to the uniform assignment of weight values. Consequently, the lane change determination is made faster than the uniform assignment of weight values.

In the above-described embodiment, although the correction of the transverse position of the target 300 by the signal processor 25 of the radar apparatus has been described, the present disclosure is not limited thereto, and the controller of the driver assistance system may perform the function of the signal processor 25.

That is, the controller 40 may accumulate objects of a target detected by the radar apparatus 20 during a plurality of scans, estimate a traveling direction of the target, estimate a heading angle of the target according to the traveling direction of the target, compare a heading angle of the target with a heading angle threshold for cut-out determination, determine whether the target changes a lane and a lane change direction based on the comparison result, assign weight values to right objects among objects of the target when the lane change direction is to the right to move a transverse position of the target to the right, assign weight values to left objects among the objects of the target when the lane change direction is to the left to move a transverse position of the target to the left, and correct the transverse position of the target by applying the weight values assigned to the lane change direction.

Meanwhile, the above-described controller (signal processor) and/or components thereof may include one or more processor(s)/microprocessor(s) combined with a computer-readable recording medium storing computer-readable codes/algorithms/software. The one or more processor(s)/microprocessor(s) may execute the computer-readable codes/algorithms/software stored in the computer-readable recording medium to perform the above-described functions, operations, and steps.

The above-described controller (signal processor) and/or the components thereof may further include a memory implemented as a computer-readable non-transitory recording medium or a computer-readable temporary recording medium.

The memory may be controlled by the above-described controller (signal processor) and/or the components thereof and may be configured to store data transmitted to or received from the above-described controller (signal processor) and/or the components thereof or to store data that has been or will be processed by the above-described controller (signal processor) and/or the components thereof.

The disclosed embodiments may also be implemented as computer-readable codes/algorithms/software on a computer-readable recording medium. The computer-readable recording medium may be a computer-readable non-transitory recording medium such as a data storage device capable of storing data which can be read by a processor/microprocessor. Examples of the computer-readable recording medium include a hard disk drive (HDD), a solid state drive (SSD), a silicon disk drive (SDD), a read-only memory (ROM), a compact disc (CD) ROM (CD-ROM), a magnetic tape, a floppy disk, and an optical data storage device.

As is apparent from the above description, a radar apparatus, a control method thereof, and a driver assistance system including the same in accordance with the embodiments of the present disclosure can more accurately and reliably determine a transverse position of a target which is changing a lane.

The radar apparatus, the control method thereof, and the driver assistance system including the same in accordance with the embodiments of the present disclosure can more accurately and reliably determine the transverse position of the target which is changing a lane, thereby improving performance of driver assistance control.

The radar apparatus, the control method thereof, and the driver assistance system including the same in accordance with the embodiments of the present disclosure can more quickly recognize a lane change of the target, thereby improving deceleration/acceleration performance during the driver assistance control.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A radar apparatus comprising:
a transmitter configured to transmit a transmission signal;
a receiver configured to receive a reception signal reflected from a target; and
a signal processor electrically connected to the transmitter and the receiver,
wherein the signal processor is configured to:
detect one or more objects corresponding to one or more points reflected from the target,
estimate a heading angle of the target based on the one or more detected objects,
determine a lane change direction of the target based on the estimated heading angle, and
correct a transverse position of the target based on the determined lane change direction,
compare the estimated heading angle with a heading angle threshold for lane change determination and determine the lane change direction of the target, correct the transverse position of the target estimated from the objects so that the transverse position of the target estimated from the objects moves in the determined lane change direction, and selectively assign weight values to a plurality of currently detected objects according to the determined lane change direction and correct the transverse position of the target by applying the objects to which the weight values are assigned.

2. The radar apparatus of claim 1, wherein the signal processor is configured to accumulate objects detected during a plurality of scans and estimates the heading angle of the target based on the accumulated objects.

3. The radar apparatus of claim 1, wherein the signal processor is configured to:

accumulate objects detected during a plurality of scans, estimate a traveling direction of the target based on the accumulated objects, and estimate the heading angle of the target based on the estimated traveling direction.

4. The radar apparatus of claim 1, wherein the signal processor is configured to:

determine that the target changes a lane to the right when the estimated heading angle is greater than a first heading angle threshold for right lane change determination and determine that the target changes a lane to the left when the estimated heading angle is greater than a second heading angle threshold for left lane change determination.

5. The radar apparatus of claim 1, wherein the signal processor is configured to determine the heading angle threshold according to a speed of the target.

6. The radar apparatus of claim 5, wherein the signal processor is configured to determine that the heading angle threshold value decreases when the speed of the target increases.

7. The radar apparatus of claim 5, wherein the signal processor is configured to determine that the heading angle threshold value increases when the speed of the target decreases.

8. The radar apparatus of claim 1, wherein the signal processor is configured to assign the weight values to objects in a right direction among the plurality of currently detected objects when the determined lane change direction is in the right direction.

9. The radar apparatus of claim 1, wherein the signal processor is configured to assign the weight values to objects in a left direction among the plurality of currently detected objects when the determined lane change direction is in the left direction.

10. A method of controlling a radar apparatus, comprising:

transmitting a transmission signal;

receiving a reception signal reflected from a target;

detecting one or more objects corresponding to one or more points reflected from the target;

estimating a heading angle of the target based on the one or more detected objects;

determining a lane change direction of the target based on the estimated heading angle; and correcting a transverse position of the target based on the determined lane change direction;

wherein the determining of the lane change direction includes:

comparing the estimated heading angle with a heading angle threshold for lane change determination; and determining the lane change direction of the target, wherein the correcting of the transverse position includes correcting the transverse position of the target estimated from the objects and moving the transverse position of the target estimated from the objects in the determined lane change direction, and selectively assigning weight values to a plurality of currently detected objects according to the determined lane change direction; and correcting the transverse position of the target by applying the objects to which the weight values are assigned.

11. The method of claim 10, wherein the estimating of the heading angle includes:

accumulating objects detected during a plurality of scans;

estimating a traveling direction of the target based on the accumulated objects; and estimating the heading angle of the target based on the estimated traveling direction.

12. The method of claim 11, wherein the determining of the lane change direction includes:

determining a heading angle threshold according to a speed of the target;

comparing the estimated heading angle with the determined heading angle threshold; and determining the lane change direction of the target.

13. The method of claim 10, wherein the correcting of the transverse position includes:

assigning the weight values to objects in a right direction among the plurality of currently detected objects when the determined lane change direction is in the right direction; and assigning the weight values to objects in a left direction among the plurality of currently detected objects when the determined lane change direction is in the left direction.

14. A driver assistance system comprising:

a radar apparatus configured to detect objects of a target in front of a vehicle;

an actuator configured to perform at least one among steering, deceleration, and acceleration of the vehicle; and a controller electrically connected to the radar apparatus, wherein the controller is configured to:

detect one or more objects corresponding to one or more points reflected from the target through the radar apparatus, estimate a heading angle of the target based on the one or more detected objects, determine a lane change direction of the target by comparing the estimated heading angle with a heading angle threshold for a lane change direction, correct a transverse position of the target according to the determined lane change direction, compare the estimated heading angle with a heading angle threshold for lane change determination and determines the lane change direction of the target, correct the transverse position of the target estimated from the objects so that the transverse position of the target estimated from the objects moves in the determined lane change direction, and selectively assign weight values to a plurality of currently detected objects according to the determined lane change direction and correct the transverse position of the target by applying the objects to which the weight values are assigned.

15. A radar apparatus comprising:

a transmitter configured to transmit a transmission signal;

a receiver configured to receive a reception signal reflected from a target; and a signal processor electrically connected to the transmitter and the receiver, wherein the signal processor is configured to:

detect one or more objects corresponding to one or more points reflected from the target, estimate a heading angle of the target based on the one or more detected objects, compare the estimated heading angle with a heading angle threshold to determine a lane change direction of the target, and correct a transverse position of the target estimated from the objects according to the determined lane change direction, wherein correcting the transverse position includes selectively assigning weight values to one or more of the detected objects according to detection reliability, and correcting the transverse position by applying the objects to which the weight values are assigned.

16. The radar apparatus of claim 15, wherein the signal processor is configured to determine the heading angle threshold according to a speed of the target.

17. The radar apparatus of claim 15, wherein the signal processor is configured to assign higher weight values to objects located in the determined lane change direction than to objects located in an opposite direction.

* * * * *